(12) United States Patent
Coombs et al.

(10) Patent No.: US 6,886,841 B2
(45) Date of Patent: May 3, 2005

(54) SUSPENSION SYSTEM FOR A VEHICLE INCLUDING AN ACCUMULATOR

(75) Inventors: Joshua D. Coombs, Whitmore Lake, MI (US); Jeremy Edmondson, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 94 days.

(21) Appl. No.: 10/224,245

(22) Filed: Aug. 20, 2002

(65) Prior Publication Data

US 2002/0195789 A1 Dec. 26, 2002

Related U.S. Application Data

(63) Continuation-in-part of application No. PCT/US01/48488, filed on Dec. 7, 2001.
(60) Provisional application No. 60/251,951, filed on Dec. 7, 2000.

(51) Int. Cl.[7] .................................................. B60G 9/04
(52) U.S. Cl. ...................... 280/124.157; 280/124.158; 280/124.159; 280/124.16
(58) Field of Search .................... 280/124.1, 124.112, 280/124.157, 124.158, 124.159, 124.16, 124.175

(56) References Cited

U.S. PATENT DOCUMENTS

| | | | |
|---|---|---|---|
| 2,070,440 A | | 2/1937 | Maddin |
| 3,154,317 A | | 10/1964 | Gustafsson |
| 3,582,106 A | * | 6/1971 | Keijzer .................... 267/64.19 |
| 3,603,576 A | | 9/1971 | Hahn |
| 3,627,248 A | | 12/1971 | Klees |
| 3,653,676 A | * | 4/1972 | Higginbotham .......... 280/6.159 |
| 3,709,517 A | | 1/1973 | Wossner |
| 3,871,635 A | | 3/1975 | Unruh et al. |
| 3,895,816 A | * | 7/1975 | Takahashi et al. ........ 280/5.503 |
| 3,961,336 A | * | 6/1976 | Walker et al. .......... 346/139 C |
| 4,371,317 A | | 2/1983 | Heibel |
| 4,441,593 A | | 4/1984 | Axthammer |
| 4,556,718 A | * | 12/1985 | Chastrette et al. .......... 549/449 |
| 4,589,678 A | | 5/1986 | Lund |
| 4,696,489 A | | 9/1987 | Fujishiro et al. |
| 4,735,402 A | | 4/1988 | Davis |
| 4,809,179 A | | 2/1989 | Klinger et al. |
| 5,011,180 A | | 4/1991 | Dunwoody |
| 5,020,826 A | | 6/1991 | Stecklein et al. |
| 5,098,119 A | * | 3/1992 | Williams et al. .......... 280/5.507 |
| 5,130,926 A | * | 7/1992 | Watanabe et al. ............. 701/37 |
| 5,137,299 A | | 8/1992 | Jones |
| 5,152,547 A | | 10/1992 | Davis |

(Continued)

OTHER PUBLICATIONS

S. Ikenaga, et al., *Active Suspension control Using a Novel Strut and Active Filtered Feedback: Design and Implementation*, Proceedings of the 1999 IEEE International Conference on Control Applications, Kohala Coast–Island of Hawai'l, Hawai'l, Aug. 22–27, 1999, Pp. 1502–1508.
See Attachment "A".
See Attachment "B".

*Primary Examiner*—Paul N. Dickson
*Assistant Examiner*—Toan C To
(74) *Attorney, Agent, or Firm*—Brinks Hofer Gilson & Lione

(57) ABSTRACT

Suspension system for a vehicle is disclosed and claimed. The suspension system includes a fluid, a suspension strut, a hydraulic cavity, an accumulator, and a volume modulator. The hydraulic cavity is at least partially defined by the suspension strut and is adapted to contain a portion of the fluid. The hydraulic cavity supplies a suspending spring force that biases a wheel of a vehicle toward the road surface. The volume modulator selectively pushes the compressible fluid into the hydraulic cavity and vents the compressible fluid from the hydraulic cavity, thereby actively modulating the suspending spring force.

19 Claims, 6 Drawing Sheets

U.S. PATENT DOCUMENTS

| | | |
|---|---|---|
| 5,231,583 A | 7/1993 | Lizell |
| 5,259,738 A | 11/1993 | Salter et al. |
| 5,265,913 A * | 11/1993 | Scheffel .................... 280/6.158 |
| 5,316,272 A | 5/1994 | Davis |
| 5,348,338 A | 9/1994 | Kuriki et al. |
| 5,522,481 A | 6/1996 | Watanabe |
| 5,572,425 A | 11/1996 | Levitt et al. |
| 5,577,579 A | 11/1996 | Derr |
| 5,584,498 A * | 12/1996 | Danek ..................... 280/5.503 |
| 5,627,751 A | 5/1997 | Davis et al. |
| 5,769,400 A | 6/1998 | Hölzl et al. |
| 6,145,859 A | 11/2000 | Altherr et al. |
| 6,227,167 B1 * | 5/2001 | Smith et al. ................ 123/446 |
| 6,264,212 B1 | 7/2001 | Timoney |
| 6,293,530 B1 | 9/2001 | Delorenzis et al. |
| 6,305,673 B1 | 10/2001 | Delorenzis et al. |
| 6,389,341 B1 | 5/2002 | Davis |

\* cited by examiner

SUSPENSION SYSTEM FOR A VEHICLE INCLUDING AN ACCUMULATOR

CROSS-REFERENCE TO RELATED APPLICATIONS

The present invention is a continuation-in-part of International Application No. PCT/US01/48488, filed 07 Dec. 2001 and entitled "Suspension System For A Vehicle", which claims benefit of U.S. provisional application Ser. No. 60/251,951, filed 07 Dec. 2000 and entitled "Compressible Fluid Strut".

TECHNICAL FIELD

The subject matter of this invention generally relates to suspension systems for a vehicle and, more particularly, to suspension systems including an accumulator adapted to contain a portion of a fluid at a predetermined pressure above atmospheric pressure.

BACKGROUND

In the typical vehicle, a combination of a coil spring and a gas strut function to allow compression movement of a wheel toward the vehicle and rebound movement of the wheel toward the ground. The suspension struts attempt to provide isolation of the vehicle from the roughness of the road and resistance to the roll of the vehicle during a turn. More specifically, the typical coil spring provides a suspending spring force that biases the wheel toward the ground and the typical gas strut provides a damping force that dampens both the suspending spring force and any impact force imparted by the road. Inherent in every conventional suspension strut is a compromise between ride (the ability to isolate the vehicle from the road surface) and handling (the ability to resist roll of the vehicle). Vehicles are typically engineered for maximum road isolation (found in the luxury market) or for maximum roll resistance (found in the sport car market). There is a need, however, for an improved suspension system that avoids this inherent compromise.

DETAILED DESCRIPTION OF THE PREFERRED EMBODIMENT

The following description of the preferred embodiment of the invention is not intended to limit the invention to the preferred embodiment, but rather to enable any person skilled in the art of suspension systems to use this invention.

Figure 1:
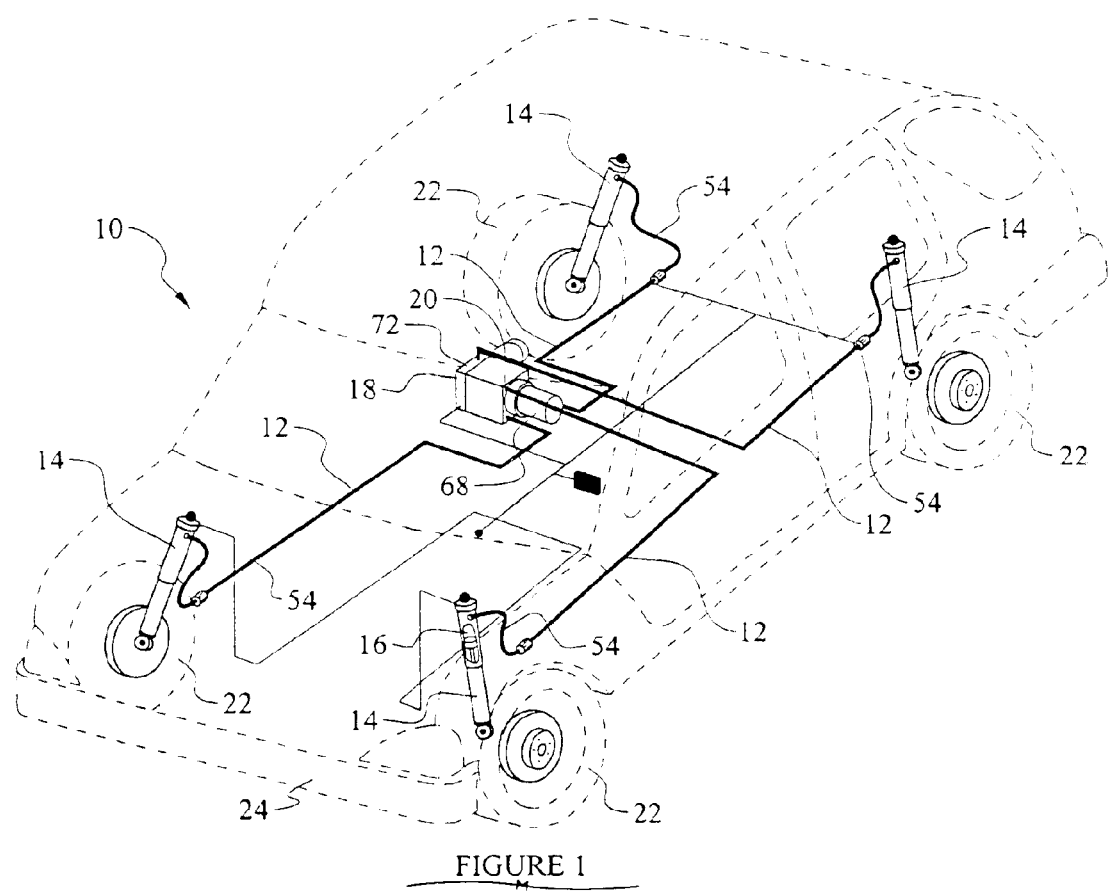
FIG. 1 is a cut away perspective view of the suspension system of the preferred embodiment, shown within a vehicle.

As shown in FIG. 1, the suspension system 10 of the preferred embodiment includes a compressible fluid 12, a suspension strut 14, a hydraulic cavity 16, an accumulator 18, and a volume modulator 20. The hydraulic cavity 16, which is at least partially defined by the suspension strut 14, contains a portion of the compressible fluid 12 and cooperates with the compressible fluid 12 to supply a suspending spring force. The suspending spring force biases a wheel 22 of the vehicle 24 toward the surface. The volume modulator 20, which is coupled to the hydraulic cavity 16 and to the accumulator 18, selectively pushes the compressible fluid 12 from the accumulator 18 into the hydraulic cavity 16 and vents the compressible fluid 12 from the hydraulic cavity 16 into the accumulator 18, thereby actively modulating the suspending spring force. By increasing the suspending spring force in the suspension struts 14 of the outside wheels during a turn, the vehicle 24 can better resist roll. By decreasing the suspending spring force over rough surfaces, the vehicle 24 can better isolate the passengers. Thus, by actively modulating the suspending spring force, the vehicle 24 can maximize both ride and handling and avoid the inherent compromise of conventional suspension systems.

Figure 2:
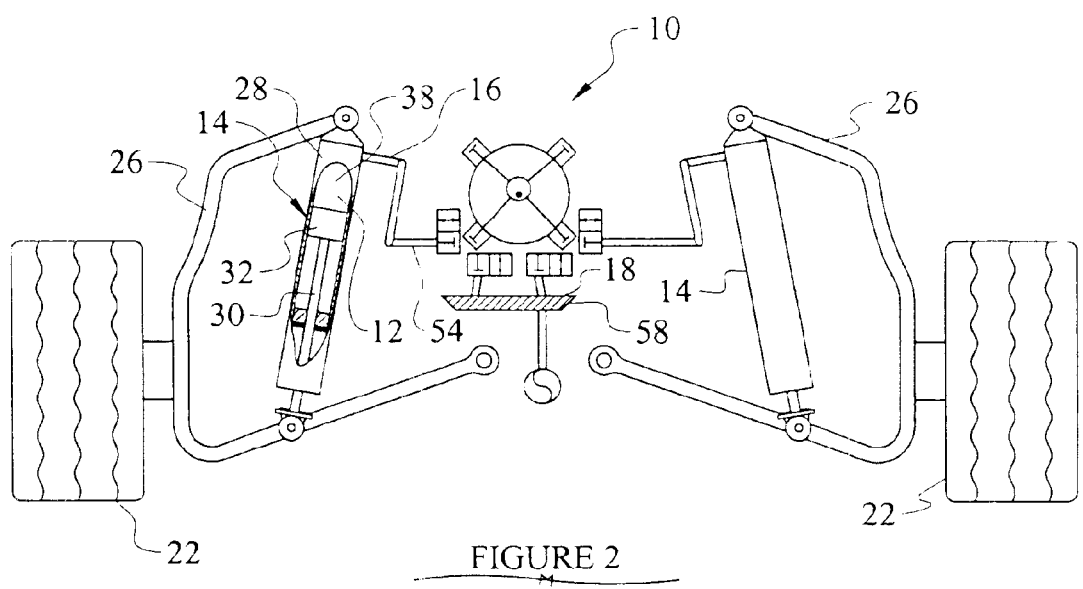
FIG. 2 is a schematic view of the suspension system of FIG. 1.

As shown in FIGS. 1 and 2, the suspension system 10 of the preferred embodiment has been specifically designed for a vehicle 24 having four wheels 22 and four suspension links 26 (two shown in FIG. 2) suspending the individual wheels 22 from the vehicle 24. The suspension links 26 allow compression movement of the individual wheels 22 toward the vehicle 24 and rebound movement of the individual wheels toward the road surface. Despite this design for a particular environment, the suspension system 10 may be used in any suitable environment, such as other vehicles with more or less wheels.

The compressible fluid 12 of the preferred embodiment, which cooperates to supply the suspending spring force, is preferably a silicon fluid that compresses about 1.5% volume at 2,000 psi, about 3% volume at 5,000 psi, and about 6% volume at 10,000 psi. Above 2,000 psi, the compressible fluid has a larger compressibility than conventional hydraulic oil. The compressible fluid, however, may alternatively be any suitable fluid, with or without a silicon component, that provides a larger compressibility above 2,000 psi than conventional hydraulic oil.

Figure 3:
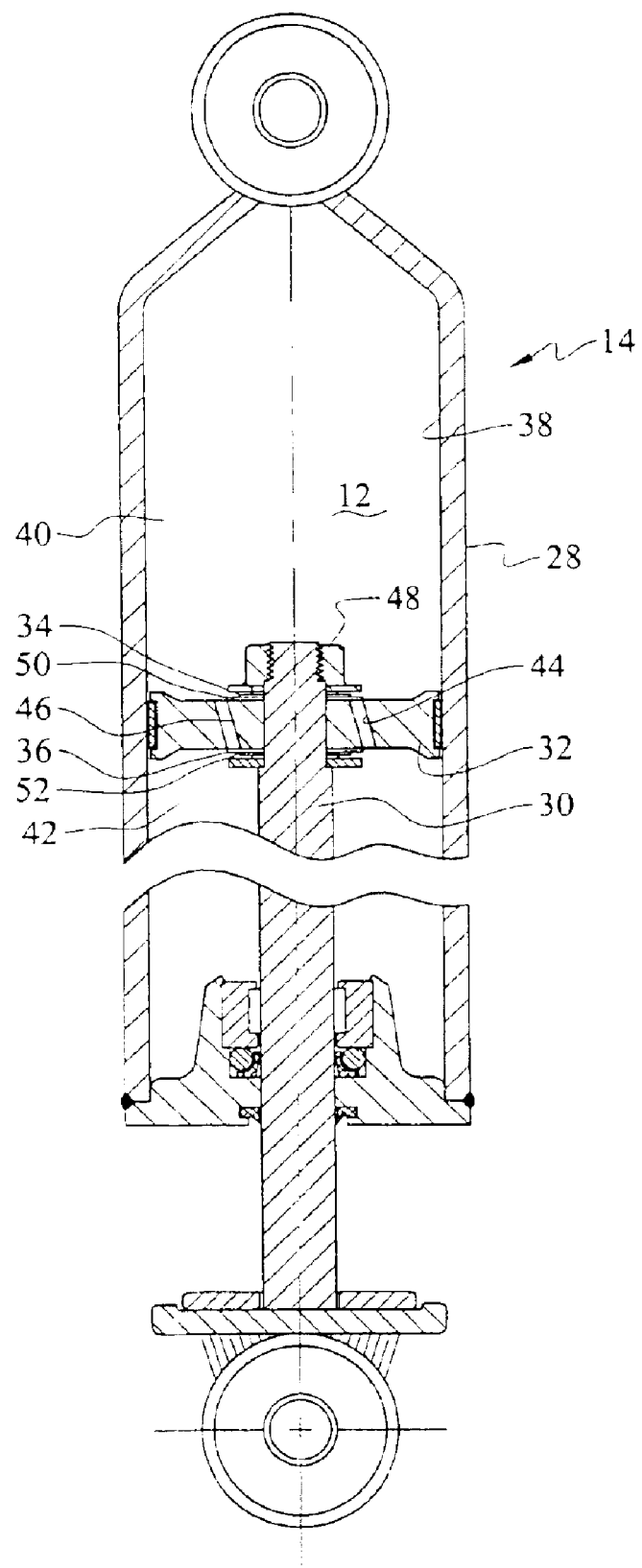
FIG. 3 is a cross-sectional view of a suspension strut of the suspension system of FIG. 1.

As shown in FIGS. 2 and 3, the suspension strut 14 of the preferred embodiment includes a hydraulic tube 28, a displacement rod 30, a cavity piston 32, a first variable restrictor 34, and a second variable restrictor 36. The hydraulic tube 28 and displacement rod 30 of the preferred embodiment cooperatively function to couple the suspension link and the vehicle and to allow compression movement of the wheel 22 toward the vehicle and rebound movement of the wheel 22 toward the road surface. The hydraulic tube 28 preferably defines an inner cavity 38, which functions to contain a portion of the compressible fluid 12. As previously mentioned, the inner cavity 38 and the compressible fluid 12 preferably cooperate to supply the suspending spring force that biases the wheel 22 toward the surface and, essentially, suspend the entire vehicle above the surface. The displacement rod 30 is adapted to move into the inner cavity 38 upon the compression movement of the wheel 22 and to move out of the inner cavity 38 upon the rebound movement of the wheel 22. As it moves into the inner cavity 38, the displacement rod 30 displaces, and thereby compresses, the compressible fluid 12. In this manner, the movement of the displacement rod 30 into the inner cavity 38 increases the suspending spring force of the suspension strut 14. As the displacement rod 30 moves out of the inner cavity 38, the compressible fluid 12 decompresses and the suspending spring force of the suspension strut 14 decreases. The displacement rod 30 is preferably cylindrically shaped and, because of this preference, the displacement of the displacement rod 30 within the inner cavity 38 and the magnitude of the suspending spring force have a linear relationship. If a linear relationship is not preferred for the particular application of the suspension strut 14, or if there is any other appropriate reason, the displacement rod 30 may be alternatively designed with another suitable shape. The hydraulic tube 28 and the displacement rod 30 are preferably made from conventional steel and with conventional methods, but may alternatively be made from any suitable material and with any suitable method.

The cavity piston 32 of the preferred embodiment is preferably coupled to the displacement rod 30 and preferably extends to the hydraulic tube 28. In this manner, the cavity piston 32 separates the inner cavity 38 into a first section 40 and a second section 42. The cavity piston 32 defines a first orifice 44 and a second orifice 46, which both preferably extend between the first section 40 and the second section 42 of the inner cavity 38. The first orifice 44 and the second orifice 46 function to allow flow of the compressible fluid 12 between the first section 40 and the second section 42 of the inner cavity 38. The cavity piston 32 is preferably securely mounted to the displacement rod 30 by a conventional fastener 48, but may alternatively be integrally formed with the displacement rod 30 or securely mounted with any suitable device. The cavity piston 32 is preferably made from conventional materials and with conventional methods, but may alternatively be made from other suitable materials and with other suitable methods.

The first variable restrictor 34 of the preferred embodiment is coupled to the cavity piston 32 near the first orifice 44. The first variable restrictor 34 functions to restrict the passage of the compressible fluid 12 through the first orifice 44 and, more specifically, functions to variably restrict the passage based on the velocity of the cavity piston 32 relative to the hydraulic tube 28. In the first preferred embodiment, the first variable restrictor 34 is a first shim stack 50 preferably made from conventional materials and with conventional methods. In alternative embodiments, the first variable restrictor 34 may include any other suitable device able to variably restrict the passage of the compressible fluid 12 through the first orifice 44 based on the velocity of the cavity piston 32 relative to the hydraulic tube 28. The second variable restrictor 36 of the preferred embodiment is coupled to the cavity piston 32 near the second orifice 46. The second variable restrictor 36—like the first variable restrictor 34—functions to restrict the passage of the compressible fluid 12 through the second orifice 46 and, more specifically, functions to variably restrict the passage based on the velocity of the cavity piston 32 relative to the hydraulic tube 28. In the preferred embodiment, the second variable restrictor 36 is a second shim stack 52 preferably made from conventional materials and with conventional methods. In alternative embodiments, the second variable restrictor 36 may include any suitable device able to variably restrict a passage of the compressible fluid 12 through the second orifice 46 based on the velocity of the cavity piston 32 relative to the hydraulic tube 28.

The cavity piston 32, the first orifice 44, and the first variable restrictor 34 of the preferred embodiment cooperate to supply the rebound damping force during the rebound movement of the wheel 22. The rebound damping force acts to dampen the suspending spring force that tends to push the displacement rod 30 out of the hydraulic tube 28. The cavity piston 32, the second orifice 46, and a second variable restrictor 36, on the other hand, cooperate to supply the compression damping force during the compression movement of the wheel 22. The compression damping force acts to dampen any impact force that tends to push the displacement rod 30 into the hydraulic tube 28.

The suspension strut 14 of the preferred embodiment is further described in U.S. application filed on 07 Dec. 2001, entitled "Compressible Fluid Strut", and assigned to Visteon Global Technologies, Inc. As described in that application, the suspension strut may include a pressure vessel and may include a valve. In alternative embodiments, the suspension strut may include any suitable device to allow active modulation of the suspending spring force with compressible fluid.

As shown in FIG. 1, the suspension system 10 of the preferred embodiment also includes hydraulic lines 54 adapted to communicate the compressible fluid 12 between the individual suspension struts 14 and the volume modulator 20. Together with the inner cavity 38 of the individual suspension struts 14, the hydraulic lines 54 define individual hydraulic cavities 16. Preferably, the compressible fluid 12 flows freely between the volume modulator 20 and the inner cavity 38 of the individual suspension struts 14. Alternatively, the hydraulic cavities 16 may include one or more controllable valves such that the hydraulic cavity 16 is entirely defined by the suspension strut 14 or by the suspension strut 14 and a portion of the hydraulic line 54.

As shown in FIG. 2, the accumulator 18 functions to contain a portion of the compressible fluid 12 that has been vented from the hydraulic cavity 16 and that may eventually be pushed into the hydraulic cavity 16 and to pressurize the compressible fluid 12 at a predetermined pressure above atmospheric pressure. By using compressible fluid 12 under a pressure of about 1500 psi within the accumulator 18, the volume modulator 20 consumes less energy to reach a particular pressure within an individual hydraulic cavity 16. Further, because the suspending spring force preferably suspends the entire vehicle and counteracts the gravitational force, pressurizing (or "supercharging") the compressible fluid 12 eliminates pumping from atmospheric pressure to the predetermined pressure to maintain the static height of the vehicle. The accumulator 18 is preferably made from conventional materials and with conventional methods, but may alternatively be made from any suitable material and with any suitable method.

As shown in FIG. 2, the volume modulator 20 is coupled to the hydraulic line 54 and to the accumulator 18. The volume modulator 20, as previously mentioned, functions to selectively push the compressible fluid 12 into the hydraulic cavity 16 and to vent the compressible fluid 12 from the hydraulic cavity 16. In the preferred embodiment, the volume modulator 20 is a digital displacement pump/motor as described in U.S. Pat. No. 5,259,738 entitled "Fluid-Working Machine" and issued to Salter et al. on 09 Nov. 1993, which is incorporated in its entirety by this reference. In alternative embodiments, the volume modulator 20 may be any suitable device that selectively pushes the compressible fluid 12 into the hydraulic cavity 16 and vents the compressible fluid 12 from the hydraulic cavity 16 at a sufficient rate to actively modulate the suspending spring force.

Figure 4:
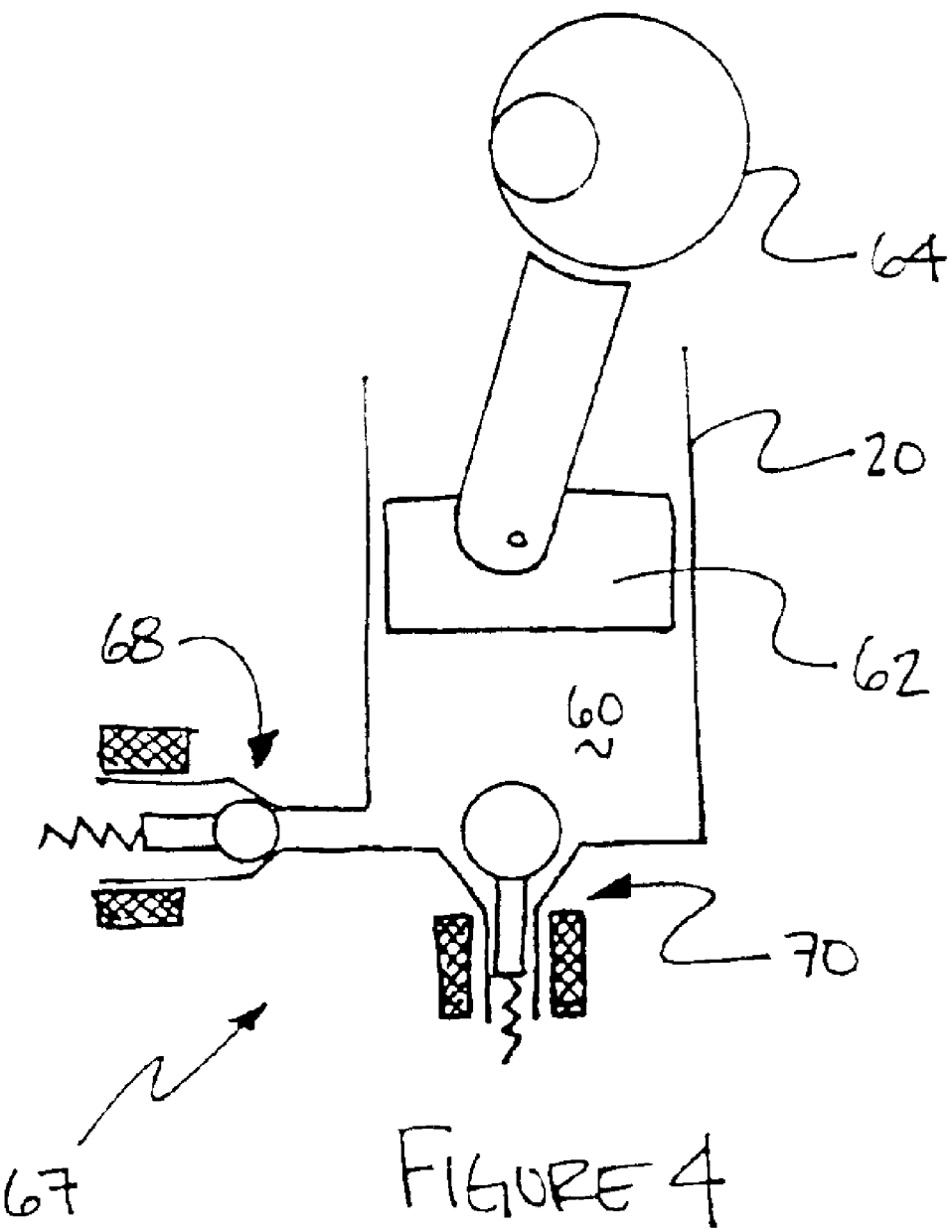
FIG. 4 is a detailed view of the volume modulator of the suspension system of FIG. 1.

As shown in FIG. 4, the volume modulator 20 of the preferred embodiment includes a modulator housing 58 defining a modulator cavity 60 and includes a modulator piston 62 adapted to continuously cycle through a compression stroke and an expansion stroke within the modulator cavity 60. The modulator piston 62 is preferably connected to an eccentric 64 that is rotated by a motor 66 (shown in FIG. 1). Because of the "active" nature of the modulation of the suspending spring force, the modulator piston 62 cycles through the compression stroke and expansion stroke at a relatively high frequency (up to 30 Hz) and, thus, the motor preferably rotates at a relatively high rotational velocity (up to 2000 rpm).

The volume modulator 20 of the preferred embodiment also includes a cavity-side valve 68 coupled between the hydraulic line and the volume modulator 20 and an accumulator-side valve 70 coupled between the reservoir and the volume modulator 20. The cavity-side valve 68 and the accumulator-side valve 70 function to selectively restrict the passage of the compressible fluid. Preferably, the cavity-side valve 68 and the accumulator-side valve 70 are so-called poppet valves that may be actuated at relatively high frequencies. Alternatively, the cavity-side valve 68 and the accumulator-side valve 70 may be any suitable device that selectively restricts the passage of the compressible fluid at an adequate frequency.

Figure 5A:
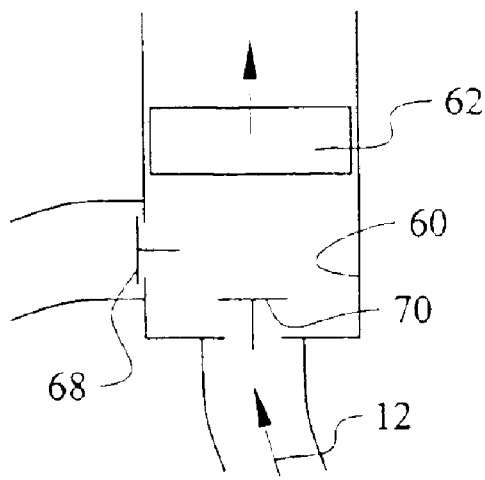
FIGS. 5A, 5B, 6A, and 6B are schematic views of the different stages of the volume modulator of FIG. 4.
Figure 5B:
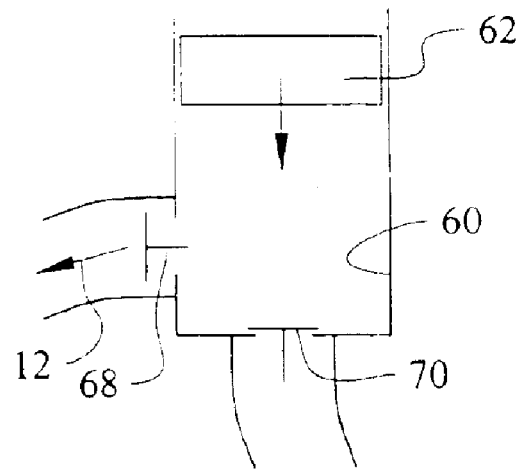

As shown in FIGS. 5A and 5B, the cavity-side valve 68, the accumulator-side valve 70, and the modulator piston 62 can cooperate to draw compressible fluid 12 from the reservoir and push the compressible fluid 12 into the hydraulic cavity. In the first stage, as shown in FIG. 5A, the cavity-side valve 68 is closed and the accumulator-side valve 70 is opened, while the modulator piston 62 increases the volume in the modulator cavity 60 (the expansion stroke). The expansion stroke of the modulator piston 62 draws the compressible fluid 12 into the modulator cavity 60. During the second stage, as shown in FIG. 5B, the accumulator-side valve 70 is closed and the cavity-side valve 68 is opened, while the modulator piston 62 decreases the volume in the modulator cavity 60 (the compression stroke). The compression stroke of the modulator piston 62 pushes the compressible fluid 12 into the hydraulic cavity, which increases the suspending spring force at that particular suspension strut and wheel.

Figure 6A:
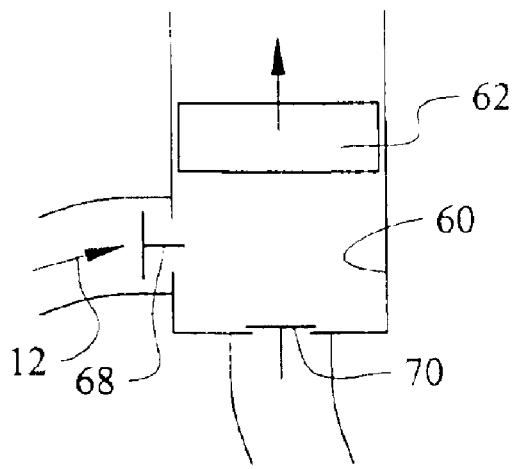
Figure 6B:
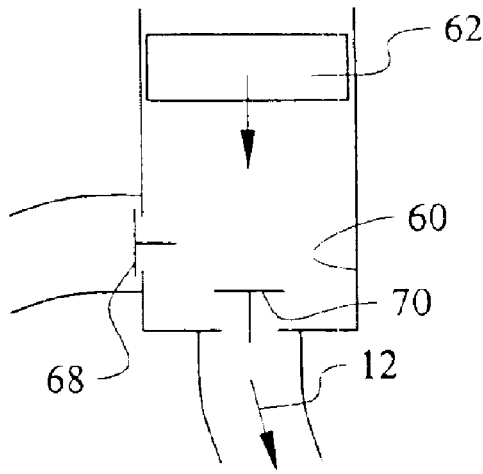

As shown in FIGS. 6A and 6B, the cavity-side valve 68, the accumulator-side valve 70, and the modulator piston 62 can also cooperate to draw compressible fluid 12 from the hydraulic cavity and vent the compressible fluid 12 into the reservoir. In the first stage, as shown in FIG. 6A, the cavity-side valve 68 is opened and the accumulator-side valve 70 is closed, while the modulator piston 62 increases the volume in the modulator cavity 60 and draws the compressible fluid 12 into the modulator cavity 60. During the second stage, as shown in FIG. 6B, the accumulator-side valve 70 is opened and the cavity-side valve 68 is closed, while the modulator piston 62 decreases the volume in the modulator cavity 60 and vents the compressible fluid 12 into the reservoir, which decreases the suspending spring force at that particular suspension strut and wheel.

During the operation of the vehicle, it may be advantageous to neither increase nor decrease the suspending spring force. Since the motor 66, the eccentric 64, and the modulator pistons 62 are continuously moving, the accumulator-side valve 70 and the volume modulator 20 can also cooperate to draw compressible fluid 12 from the reservoir (shown in FIG. 5A) and vent the compressible fluid 12 back into the reservoir (shown in FIG. 6B). This process does not modulate the pressure of the hydraulic cavity 16 and does not increase or decrease the suspending spring force.

Although FIGS. 5A, 5B, 6A, and 6B show only one modulator cavity 60 and modulator piston 62, the volume modulator 20 preferably includes a modulator cavity 60, a modulator piston 62, a cavity-side valve 68, and an accumulator-side valve 70 for each suspension strut 14 on the vehicle 24. Preferably, the motor 66 and the eccentric 64 drive the multiple modulator pistons 62, but the individual modulator pistons 62 may alternatively be driven by individual motors and individual eccentrics. Further, a control unit 72 (shown in FIG. 1) may individually control the cavity-side valve 68 and accumulator-side valve 70 corresponding to a particular suspension strut 14 and wheel 22 to adjust the ride and handling of the vehicle 24 on a wheel-to-wheel basis. The control unit 72 may also be used to adjust particular suspension struts 14 on a side-by-side basis of the vehicle 24 to adjust the roll or the pitch of the vehicle 24. The control unit 72 may further be used to adjust all of the suspension struts 14 to adjust the ride height of the vehicle 24. The control unit 72 is preferably made from conventional material and with conventional methods, but may alternatively be made from any suitable material and with any suitable method.

Figure 7:
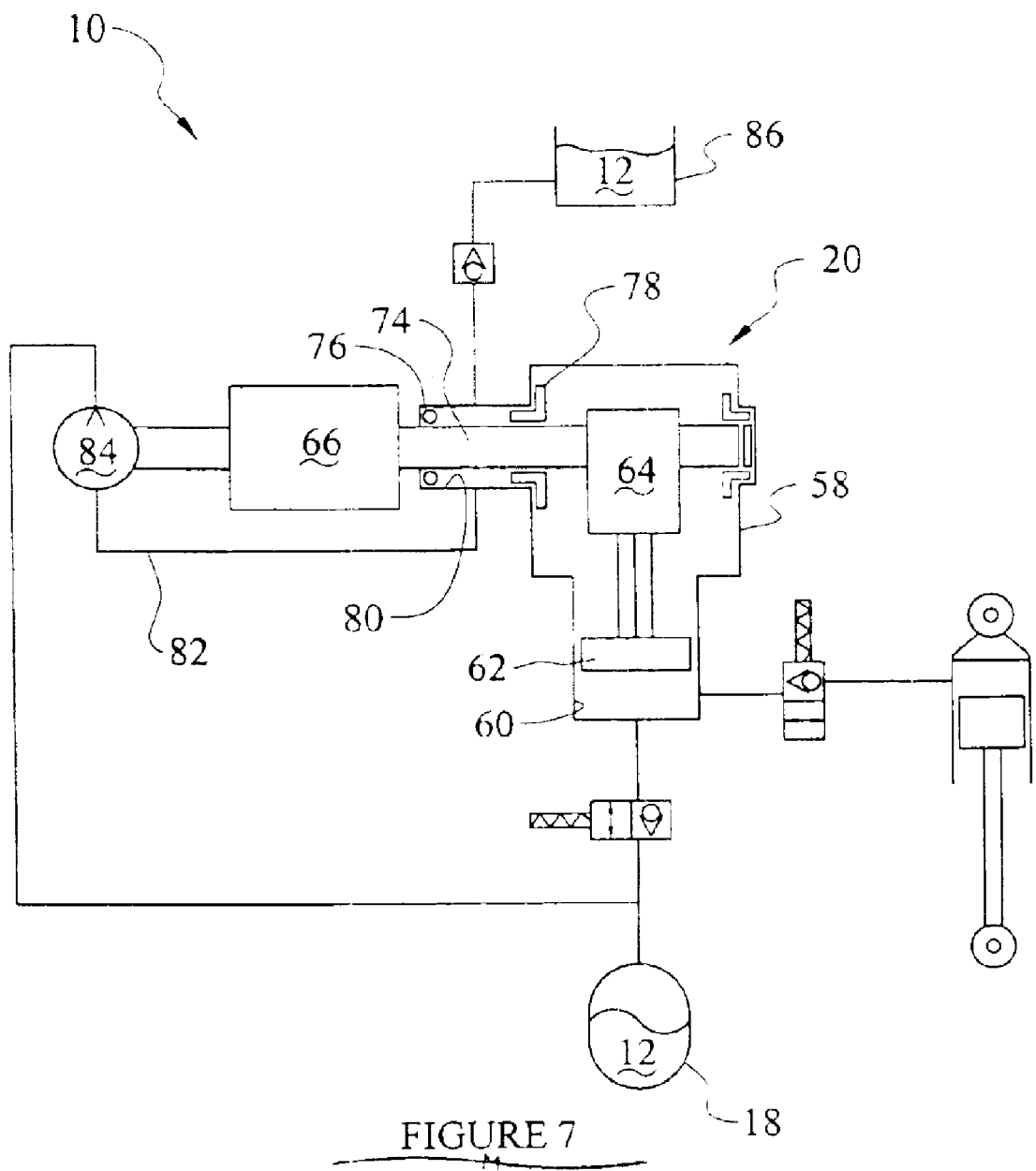
FIG. 7 is another schematic view of the suspension system of FIG. 1, shown from a different perspective than FIG. 2.

As shown in FIG. 7, the volume modulator 20 of the preferred embodiment also includes a crankshaft 74, an atmospheric seal 76, and a fluid bearing 78. The crankshaft 74 functions to translate rotational power from the motor 66 to the eccentric 64. The atmospheric seal 76 functions to seal the crankshaft 74 and the modulator housing 58. The atmospheric seal 76 is preferably maintained at atmospheric pressure during operation of the volume modulator 20, which reduces seal friction and energy requirements of the suspension system 10. The fluid bearing 78, which is preferably located between the modulator piston 62 and the atmospheric seal 76, functions to mount the crankshaft 74 to the modulator housing 58 for rotational movement. The fluid bearing 78 is preferably hydro-dynamically balanced, which allows internal leakage of the pumped fluid from the modulator cavity 60 into a crank cavity 80 defined by the modulator housing 58, the atmospheric seal 76, and the fluid bearing 78. The leaked fluid is preferably scavenged from the crank cavity 80 to the accumulator 18 through a second hydraulic line 82 by a pump 84. The pump 84 is preferably powered by a second output of the motor 66, but may alternatively be powered by another suitable device.

The suspension system 10 of the preferred embodiment also includes a reservoir 86 connected to the crank cavity 80. The reservoir 86 functions to contain a portion of the compressible fluid 12 at atmospheric pressure. With this arrangement, the accumulator 18 is preferably re-charged with leaked fluid from the crank cavity 80 and atmospheric fluid from the reservoir 86.

As any person skilled in the art of suspension systems will recognize from the previous detailed description and from the figures and claims, modifications and changes can be made to the preferred embodiment of the invention without departing from the scope of this invention defined in the following claims.

We claim:

1. A suspension system for a vehicle having a wheel contacting a surface under the vehicle and a suspension link suspending the wheel from the vehicle and allowing relative movement of the wheel and the vehicle, said suspension system comprising:

a suspension strut adapted to couple the suspension link and the vehicle;

a hydraulic cavity at least partially defined by said suspension strut and adapted to contain a portion of a fluid and to supply a suspending spring force that biases the wheel toward the surface;

an accumulator adapted to contain a portion of the fluid at a predetermined pressure above atmospheric pressure;

a volume modulator in fluidic communication with said hydraulic cavity and said accumulator and adapted to selectively push the fluid into said hydraulic cavity and vent the fluid from said hydraulic cavity, thereby actively modulating said suspending spring force, wherein said volume modulator includes a modulator housing defining a modulator cavity, a crankshaft, a modulator piston coupled to said crankshaft and adapted to cycle through a compression stroke and ar expansion stroke within said modulator cavity, a cavity-side valve coupled between said hydraulic cavity and said volume modulator and adapted to selectively restrict the passage of the fluid between said hydraulic cavity and said modulator cavity, and an accumulator-side valve coupled between said accumulator end said volume modulator and adapted to selectively restrict the passage of the fluid between said reservoir and said modulator cavity;

a compressible fluid; wherein said hydraulic cavity is further adapted to cooperate with said compressible fluid to supply the suspending spring force.

2. The suspension system of claim 1 wherein said compressible fluid includes a silicone fluid.

3. The suspension system of claim 1 wherein said compressible fluid has a larger compressibility above 2,000 psi thin hydraulic oil.

4. The suspension system of claim 1 wherein said compressible fluid is adapted to compress about 1.5% volume at 2,000 psi, about 3% volume at 5,000 psi, and about 6% volume at 10,000 psi.

5. The suspension system of claim 1 wherein said suspension strut includes a displacement rod adapted to move into said hydraulic cavity and to compress said compressible fluid upon the relative movement of the wheel and the vehicle.

6. The suspension system of claim 5 wherein said displacement rod includes a cavity piston adapted to supply a damping force.

7. The suspension system of claim 1 wherein sold hydraulic cavity is defined by said suspension strut and a first hydraulic line adapted to communicate the fluid between said suspension strut and said volume modulator.

8. The suspension system of claim 1 wherein said volume modulator further includes an atmospheric seal adapted to seal said crankshaft and said modulator housing.

9. The suspension system of claim 8 wherein said volume modulator further includes a fluid bearing located between said modulator piston and said atmospheric seal and adapted to mount said crankshaft to said modulator housing for rotational movement.

10. The suspension system of claim 9 wherein said modulator housing, said atmospheric seal, and said fluid bearing define a crank cavity.

11. The suspension system of claim 10 further comprising a reservoir in direct fluidic communication with said crank cavity and adapted to contain a portion of the fluid at atmospheric pressure.

12. The suspension system of claim 10 further comprising a second hydraulic line adapted to communicate the fluid between said crank cavity and said accumulator.

13. The suspension system of claim 10 further comprising a pump coupled between said crank cavity and said accumulator and adapted to pump fluid into said accumulator.

14. The suspension system of claim 13 further comprising an electric motor driving said crankshaft and said pump.

15. The suspension system of claim 1 wherein said volume modulator further defines a crank cavity, and wherein at least a portion of said crankshaft is located in said crank cavity.

16. The suspension system of claim 15 further comprising a second hydraulic line adapted to communicate the fluid between said crank cavity and said accumulator.

17. The suspension system of claim 15 further comprising a pump connected coupled between said crank cavity and said accumulator and adapted to pump fluid into said accumulator.

18. The suspension system of claim 17 further comprising an electric motor coupled to said crankshaft and to said pump.

19. A volume modulator of claim 1, wherein the volume modulator is positioned between the hydraulic cavity and the accumulator to regulate the fluid flow therebetween.

* * * * *